(12) United States Patent
Ho et al.

(10) Patent No.: US 11,428,586 B2
(45) Date of Patent: Aug. 30, 2022

(54) INFRARED THERMOMETER

(71) Applicant: MICROLIFE CORPORATION, Taipei (TW)

(72) Inventors: Chia-Chen Ho, Taipei (TW); Shih-Wei Huang, Taipei (TW)

(73) Assignee: MICROLIFE CORPORATION, Taipei (TW)

(*) Notice: Subject to any disclaimer, the term of this patent is extended or adjusted under 35 U.S.C. 154(b) by 371 days.

(21) Appl. No.: 16/813,744

(22) Filed: Mar. 10, 2020

(65) Prior Publication Data
US 2020/0300715 A1    Sep. 24, 2020

(30) Foreign Application Priority Data

Mar. 19, 2019  (TW) .................... 108109404

(51) Int. Cl.
| | |
|---|---|
| *G01J 5/00* | (2022.01) |
| *G01K 13/20* | (2021.01) |
| *G01J 5/02* | (2022.01) |
| *G01J 5/08* | (2022.01) |
| *G01J 5/04* | (2006.01) |

(52) U.S. Cl.
CPC ............ *G01K 13/223* (2021.01); *G01J 5/025* (2013.01); *G01J 5/026* (2013.01); *G01J 5/0265* (2013.01); *G01J 5/049* (2013.01); *G01J 5/0896* (2013.01)

(58) Field of Classification Search
CPC ........ G01K 13/223; G01J 5/025; G01J 5/026; G01J 5/0265; G01J 5/049; G01J 5/0896; G01J 5/04; G01J 5/07; G01J 5/0025
See application file for complete search history.

(56) References Cited

U.S. PATENT DOCUMENTS

| | | | |
|---|---|---|---|
| 2009/0304042 A1* | 12/2009 | Agronin | ................. G01J 5/026 374/112 |
| 2017/0191880 A1 | 7/2017 | Withings | |

* cited by examiner

*Primary Examiner* — Kiho Kim
(74) *Attorney, Agent, or Firm* — Li & Cai Intellectual Property Office

(57) ABSTRACT

The present invention is related to a non-contact infrared thermometer, which includes at least three infrared sensors, an indicating unit and a microprocessor. The at least three infrared sensors are arranged in serial to receive an infrared ray at a target area. The indicating unit is configured to emit visible light on the target area to indicate a received infrared region. The microprocessor is configured to receive and process the infrared ray measured by the at least three infrared sensors to provide at least three temperature values, thereby determining that the object to be measured is an organism.

16 Claims, 18 Drawing Sheets

INFRARED THERMOMETER

CROSS-REFERENCE TO RELATED PATENT APPLICATION

This application claims the benefit of priority to Taiwan Patent Application No. 108109404, filed on Mar. 19, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to an infrared thermometer, in particular, to a non-contact infrared thermometer.

BACKGROUND OF THE DISCLOSURE

Non-contact infrared thermometers are widely used to measure human body temperature. The non-contact infrared thermometer can measure body temperature without touching the skin of the test object, so it is useful for patients who are at rest or infants who feel uncomfortable easily, and can be widely employed for hygiene reasons. However, when using the non-contact infrared thermometer, especially for the purpose of measuring the temperature of the forehead, it is difficult for the user to find the position of the arterial blood vessel on the forehead that is closest to the core body temperature of human body and find the optimal measurement distance for the infrared sensor to receive infrared rays, thus resulting in the difficulty in accurately measuring the body temperature. In addition, considering that the core body temperature of an infant is generally higher than that of an adult, calculation methods of measuring the body temperature of the forehead surface and converting it into the core body temperature are different. If the core body temperature is merely converted into a single mode, measurement errors are easy to occur. Therefore, how to improve the measurement accuracy of non-contact infrared thermometers by increasing the design and improvement of auxiliary components in order to overcome the above-mentioned defects has become one of the important issues to be solved in the field.

In addition, the article "Detection of body temperature with infrared thermography: accuracy in detection of fever" written by Dr. Cheung Man Yung et al. and published on the Hong Kong Medical Journal, Vol. 18 mentions that the temperatures obtained from the frontal (Areamax) or lateral (Latmax) of the face or the forehead temperature of each person are different, and the temperatures obtained from the forehead temperature and the core body temperature of people of different age groups are not the same. Therefore, how to use appropriate calculation methods to distinguish and calculate core body temperature for different age groups, such as infants, young adults, and middle-aged or elderly people, has become one of the important issues to be solved in the field of non-contact infrared thermometers.

The thermometer device disclosed in the US Patent Publication No. US 20170191880 is provided with an array of at least 8 infrared sensors for detecting infrared signals on the surface of the forehead of the object. After analysis, the highest temperature value can be found from the received infrared signal, and the highest temperature value can correspond to the vascular arterial temperature on the forehead surface, thereby accurately converting the core temperature value of the human body.

SUMMARY OF THE DISCLOSURE

The technical problem to be solved by the present disclosure is to provide infrared sensors arranged in serial for overcoming the shortcomings of the related art, which can scan the temperature of a region on the skin surface of the object and filter the measured temperatures to select the highest one, and the highest temperature value is converted into the object's core body temperature value to increase the accuracy of temperature measurement of the thermometer. In addition, in order to make the user know clearly the infrared region of the skin surface where the thermometer receives from, an indicating unit is provided to indicate the received infrared region on the skin surface of the object through visible light to prevent the user from selecting the incorrect skin region of the object, thereby increasing the accuracy of body temperature measurement.

In order to overcome the aforementioned technical problems, one of the technical solutions adopted by the present disclosure is to provide a non-contact infrared thermometer for measuring the temperature of a target area of an object to be measured, comprising: at least three infrared sensors arranged in serial to receive an infrared ray at the target area; an indicating unit configured to emit a visible light on the target area to indicate a received infrared region, and a microprocessor configured to receive and process the infrared ray measured by the at least three infrared sensors to provide at least three temperature values, thereby determining whether the object to be measured is an organism.

In the non-contact infrared thermometer, the visible light is an elongated visible light.

The non-contact infrared thermometer further includes a storage unit configured to store a temperature distribution curve database of the organism to provide the microprocessor with access.

The microprocessor of the non-contact infrared thermometer establishes a temperature distribution curve based on the at least three temperature values; when the temperature distribution curve database of the organism includes the temperature distribution curve, the microprocessor determines that the object to be measured is an organism. That is, the organism is a patient.

The non-contact infrared thermometer further includes a storage unit configured to store a temperature distribution curve database of the organism to provide the microprocessor with access.

The microprocessor of the non-contact infrared thermometer filters the at least three temperature values to select a highest temperature value and a lowest temperature value; when the temperature difference between the highest temperature value and the lowest temperature value is greater than or equal to a temperature threshold value, the microprocessor determines that the object to be measured is an organism.

When the microprocessor of the non-contact infrared thermometer determines that the object to be measured is an organism, the microprocessor selects the highest temperature value obtained from the at least three temperature values and converts the highest temperature value into a core body temperature value. When the microprocessor determines that the object to be measured is not an organism, a measurement of average temperature of the target area is completed.

The storage unit of the non-contact infrared thermometer is configured to store an infant mode, a young adult mode, and a middle-aged or elderly person mode for converting the highest temperature value into a core body temperature value to provide the microprocessor with access.

The microprocessor of the non-contact infrared thermometer is configured to store a temperature distribution curve database for infant, a temperature distribution curve database for young adult, and a temperature distribution curve database for middle-aged or elderly person.

After the microprocessor of the non-contact infrared thermometer determines that the object to be measured is an organism, the microprocessor further determines which of the temperature distribution curve database for infant, the temperature distribution curve for young adult, and the temperature distribution curve database for middle-aged or elderly person includes the temperature distribution curve.

In the microprocessor of the non-contact infrared thermometer, the storage unit is configured to store a first temperature threshold, a second temperature threshold, and a third temperature threshold to provide the microprocessor with access, wherein the first temperature threshold is greater than the second temperature threshold, and the second temperature threshold is greater than the third temperature threshold.

After the microprocessor of the non-contact infrared thermometer determines that the object to be measured is an organism, the microprocessor further determines whether the temperature difference is greater than the first temperature threshold; if not, the microprocessor determines whether the temperature difference is greater than the second temperature threshold; if not, the microprocessor determines whether the temperature difference is greater than the third temperature threshold.

In the non-contact infrared thermometer, when the microprocessor determines that the temperature difference is greater than the first temperature threshold, the infant mode is selected for calculation of a core body temperature value; when the microprocessor determines that the temperature difference is greater than the second temperature threshold, the young adult mode is selected for calculation of a core body temperature value; and when the microprocessor determines that the temperature difference is greater than the third temperature threshold, the middle-aged or elderly person mode is selected for calculation of a core body temperature value.

In order to solve the above technical problem, another technical solution adopted by the present disclosure is to provide a non-contact infrared thermometer, including: a casing of which an wall end is provided with a first opening and a second opening; at least three infrared sensors having a region for receiving infrared rays, wherein the at least three infrared sensors are arranged in serial in the casing and configured to receive infrared rays from an outside of the casing through the first opening; an indicating unit disposed in the casing and emitting a visible light toward the outside through the second opening to indicate the received infrared region to the user; a microprocessor electrically connected to the at least three infrared sensors; and a distance sensor electrically connected to the microprocessor and configured to measure a distance value, wherein the microprocessor receives the at least three temperature values measured by the at least three infrared sensors and then filters a highest temperature value among the at least three temperature values and converts the highest temperature value into a core body temperature value based on a signal.

In the non-contact infrared thermometer, the received infrared region includes two boundaries, and the two boundaries have an angle of 30 to 60 degrees with the outer surface of the end wall.

The non-contact infrared thermometer further includes a storage unit configured to store a width threshold of the two boundaries, wherein the microprocessor calculates a width value of the two boundaries according to a first distance value, the included angle, and the distance value between the infrared sensors at both ends of the at least three infrared sensors arranged in serial; and when the width value is less than the width threshold, the microprocessor selects the infant mode for the conversion of the core body temperature value.

The microprocessor of the non-contact infrared thermometer further calculates a width value of the two boundaries according to the first distance value, the included angle, and the distance value between the infrared sensors at both ends of the at least three infrared sensors arranged in serial; and when the width value is greater than the width threshold, the microprocessor selects the young adult mode or the middle-aged or elderly person mode for the conversion of the core body temperature value.

One of the beneficial effects of the present disclosure is that the non-contact infrared thermometer provided by the present disclosure is capable of improving the measurement accuracy and convenience of the non-contact infrared thermometer by means of the technical solutions "infrared sensors arranged in serial" and "an indicating unit configured to indicate the received infrared region of the infrared sensor to the user".

BRIEF DESCRIPTION OF THE DRAWINGS

FIGS. 12-1 and 12-2 are an operation flowchart of the infrared thermometer according to the third embodiment of the present disclosure.

FIGS. 13-1 and 13-2 are an operation flowchart of the infrared thermometer according to the fourth embodiment of the present disclosure.

FIGS. 14-1 and 14-2 are an operation flowchart of the infrared thermometer according to the fifth embodiment of the present disclosure.

DETAILED DESCRIPTION OF THE EXEMPLARY EMBODIMENTS

Figure 1:
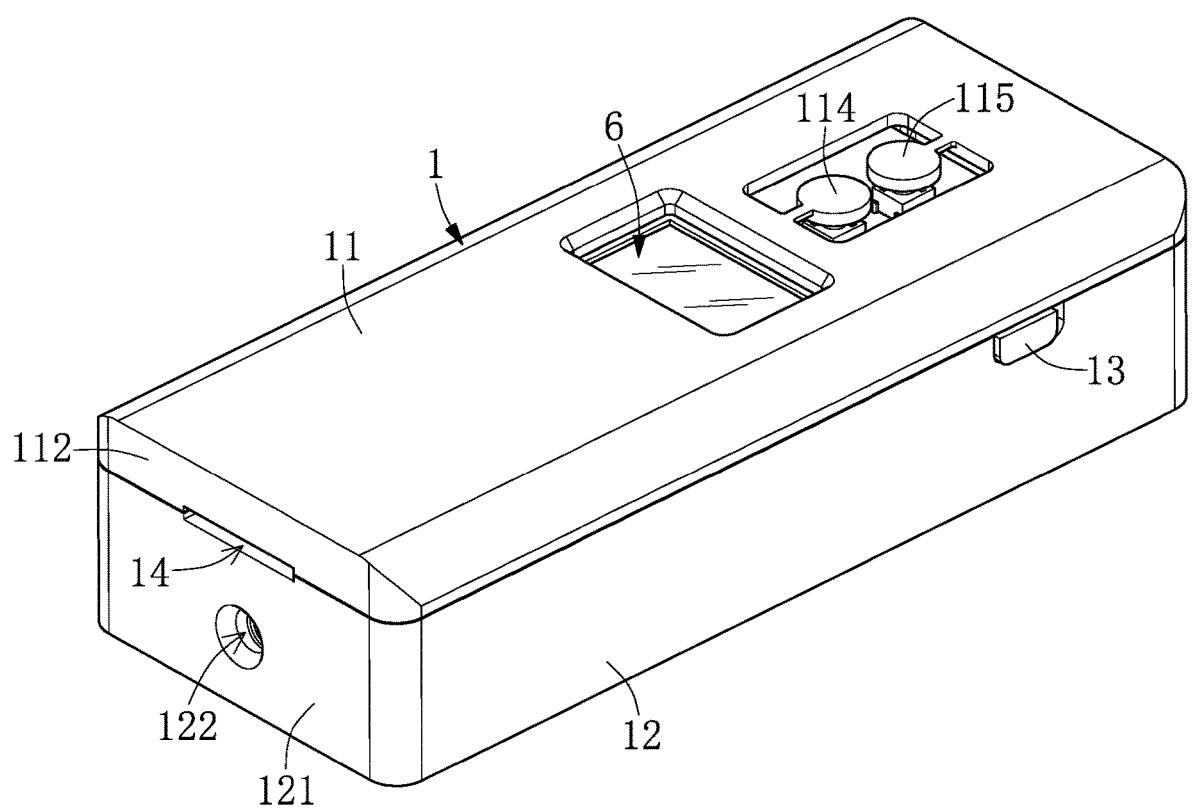
FIG. 1 is a perspective view of the infrared thermometer according to the first embodiment of the present disclosure.

Referring to FIGS. 1 to 7, the first embodiment of the present disclosure provides a non-contact infrared thermometer, which includes a casing 1, an infrared sensor module 21, a shielding ring 22, an infrared sensor module support 23, an indicating unit 3, an inner box 4, a printed circuit board 5, a display 6, and a conductive plate 7 of a distance sensor. This embodiment only illustrates a non-contact forehead thermometer, but is not limited to the example given above.

Figure 2:
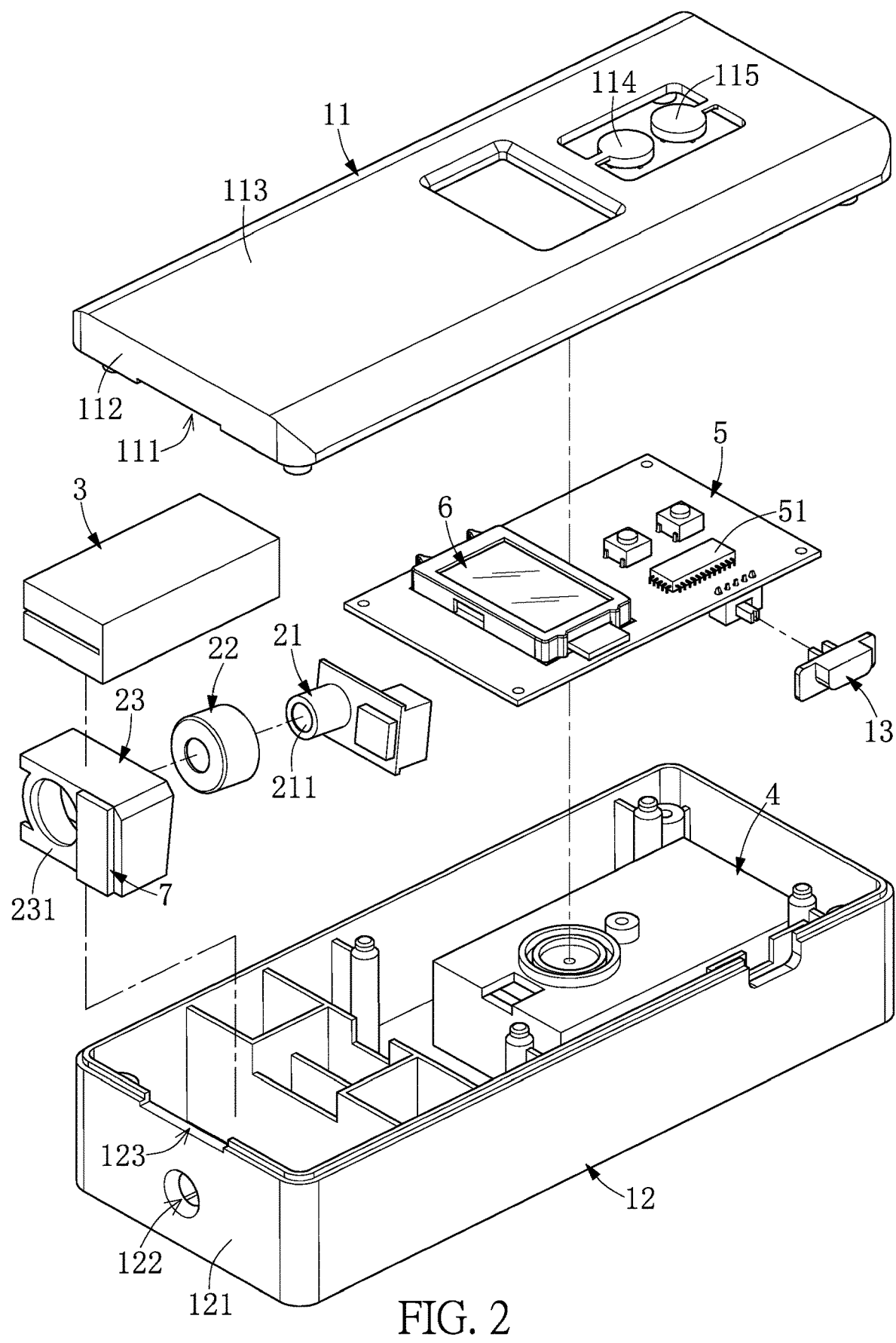
FIG. 2 is an exploded view of FIG. 1.

As shown in FIG. 1 and FIG. 2, the casing 1 according to the first embodiment of the present disclosure includes an upper casing 11 and a lower casing 12. When the upper casing 11 and the lower casing 12 are joined together, a space for accommodating components is formed inside the casing 1 for disposing the infrared sensor module 21, the shielding ring 22, the infrared sensor module support 23, the indicating unit 3, the inner box 4, the printed circuit board 5, the display 6, and the conductive plate 7. The conductive plate 7 is made of metal or carbon. However, the casing 1 of the present disclosure is not limited to the example given above. For example, the casing 1 of the present disclosure may be integrally formed, and does not need to be divided into an upper casing or a lower casing. As long as an accommodating space can be formed inside the casing 1 for accommodating other components for measuring temperature, it can be used as the casing 1 of the present disclosure.

In the first embodiment of the present disclosure, a first opening 122 is provided on a first end wall 121 of the casing 1 for allowing the infrared sensor module 21 to receive the external infrared rays through the first opening 122. In this embodiment, the first opening 122 is provided on the first end wall 121 of the lower case 12 and formed as a circular through hole. The first opening 122 may also have any shape, such as an oval, a quadrangle, etc. as long as the infrared rays in a target area of an object to be measured can properly enter the infrared sensor module 21 through the first opening 122 to receive the infrared rays without being refracted. However, the present disclosure is not limited to the example given above.

The casing 1 is further provided with a second opening 14. In the embodiment of the present disclosure, the second opening 14 is formed by a combination of a first groove 111 of the upper case 11 and a second groove 123 of the lower case 12. When the upper case 11 and the lower case 12 are combined, as shown in FIG. 1, the second opening 14 is formed on the first end wall 121 and the second end wall 112 of the casing 1 and is an elongated opening, but the present disclosure is not limited to the example given above. The position of the second opening 14 may be only on the second end wall 112 of the upper case 11 or only on the first end wall 121 of the lower case 12, and the shape of the second opening 14 may be any shape such as square, round or ellipse. The number of the second openings 14 is not limited to one, and may be plural. The shape and number of the second openings 14 depend on the visible light to be emitted by the indicating unit 3 (detailed below).

The infrared sensor module 21 according to the first embodiment of the present disclosure is disposed in the internal space of the casing 1. The cylindrical shape of the infrared sensor module 21 can be fitted in the shielding ring 22 in cooperation. The surface of the shielding ring 22 is black-plated to generate a shielding effect, so that the infrared sensor module 21 only receives infrared rays directly entering in the same direction. In addition, the material of the shielding ring 22 in the embodiment of the present disclosure is provided with a large amount of enthalpy, such as copper, aluminum, or other equivalent metals, so as to prevent the measurement accuracy of the infrared sensor from being affected due to the environment or the surrounding heat. The infrared sensor module 21 sleeved on the shielding ring 22 can also be sleeved in the infrared sensor module support 23 to align the receiving hole of the infrared sensor module 21 with the first opening 122, so that infrared rays can be received from the outside.

Figure 3:
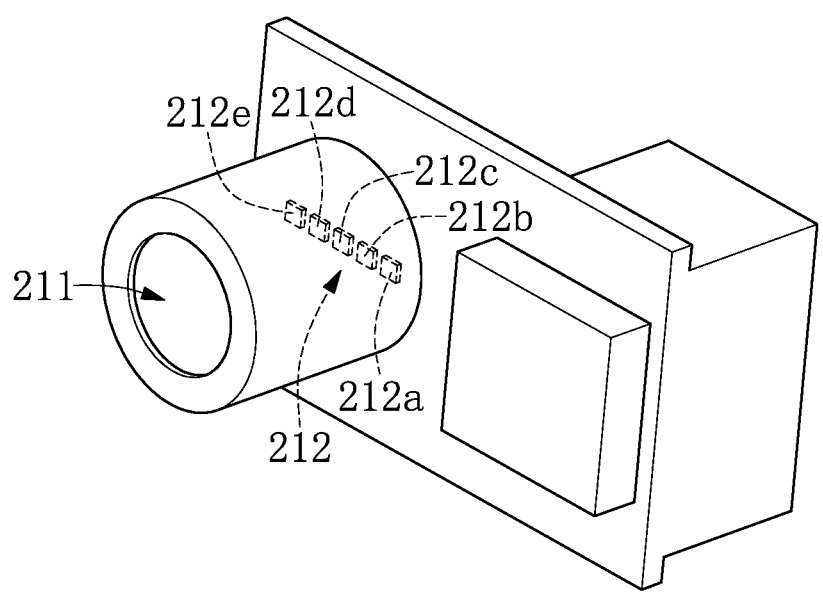
FIG. 3 is a perspective view of the infrared sensor according to the first embodiment of the present disclosure.

As shown in FIG. 3, the infrared sensor module 21 according to the first embodiment of the present disclosure has five infrared sensors 212, which are arranged in an array facing a lens 211, and the array is in a form of 1×5. However, the number and the array of the infrared sensors 212 of the present disclosure are not limited to the example given above. The number of the infrared sensors 212 may be at least three, for example, three to nine, or 1×3, 1×5, 1×7, 1×8, 1×9, as long as the infrared sensors can be arranged in serial.

Figure 4:
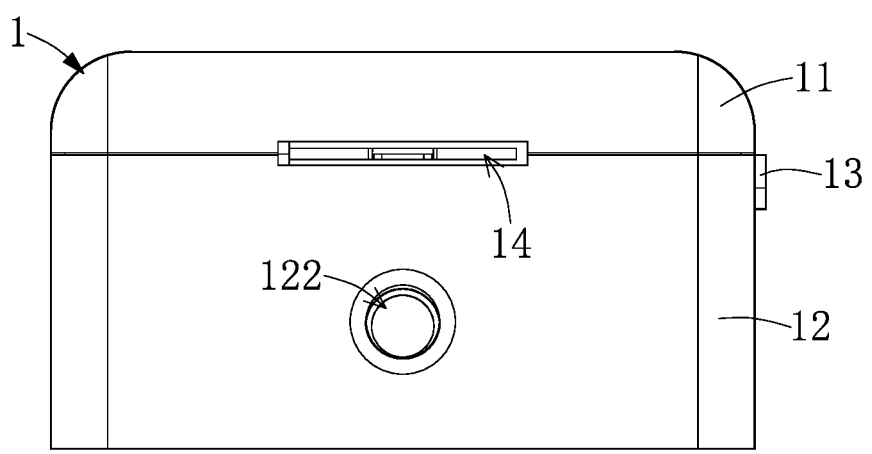
FIG. 4 is a front view of the infrared thermometer of FIG. 1.

Referring to FIG. 4, a front view of the infrared thermometer according to the first embodiment of the present disclosure is shown. The first opening 122 and the second opening 14 are provided on the end wall of the casing 1, and the second opening 14 is disposed above the first opening 122. However, the present disclosure is not limited to the example given above, as long as the visible light emitted through the second opening 14 can cover the received infrared region of the infrared sensor in the first opening 122 on the skin surface of the object. The relative position of the second opening 14 and the first opening 122 should not be limited to this embodiment, and the second opening 14 can also be disposed below or on both sides of the first opening 122. Those skilled in the art should know that the second openings 14 can be respectively disposed on both sides of the first opening 122 at a horizontal position, and the visible light forms two light spots through the two second openings 14 at a specific angle.

Figure 5:
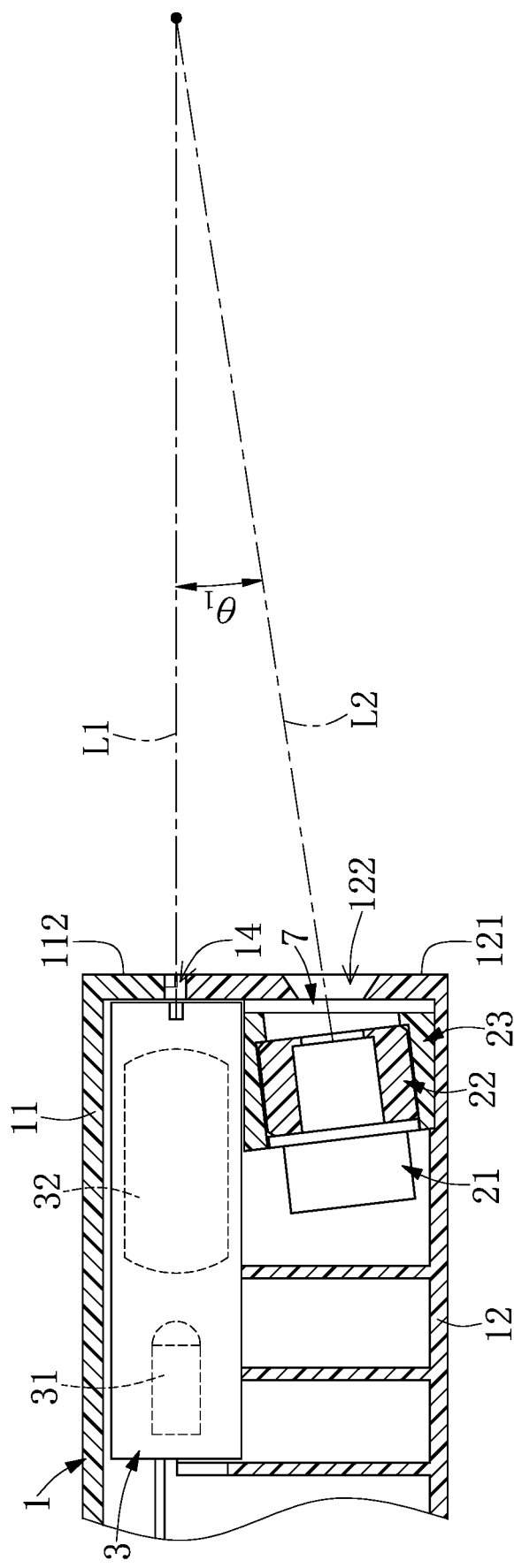
FIG. 5 is a side sectional view of the infrared thermometer according to the first embodiment of the present disclosure.

As shown in FIG. 2, FIG. 4 and FIG. 5, the indicating unit 3 according to the embodiment of the present disclosure is disposed in the casing 1 and on the infrared sensor module 21. The indicating unit 3 has a light-emitting source 31 and a light guide element 32, and emits visible lights outward through the second opening 14 to irradiate a target area of an object to be measured; that is, a part of the skin surface of the face. In this embodiment, the visible light is a light of a specific spectrum, such as a green light or a red light, which can illuminate moisture on the skin surface of the object to be measured. Those skilled in the art will know that if a large region of moisture covers the skin surface of the object to be measured, it can be removed if necessary to avoid affecting the accuracy of the temperature measurement. In FIG. 5, the direction $L_1$ of the visible light emitted by the indicating unit 3 is perpendicular to the end wall (the first end wall 121 or the second end wall 112) of the casing 1. With the infrared sensor module 21 set to an upward tilt angle $\theta_1$, there is also an included angle $\theta_1$ between the direction $L_1$ of the visible light and the direction $L_2$ where the infrared sensor module 21 receives infrared rays, so that the irradiation region of the visible light and the irradiation region where the infrared sensor module 21 receives infrared rays are substantially the same. In other embodiments, the indicating unit 3 is arranged to incline downward and emit visible light, and the longitudinal or axial axis of the infrared sensor module 21 is perpendicular to the end wall of the casing 1. In the embodiment of the present disclosure, the angle $\theta_1$ is in the range of 3° to 10°, and preferably 6.5°. In addition, the light-emitting source 31 may be an elongated light-emitting source composed of a light-emitting diode (LED) and a light guide pillar, and emits a visible light with an elongated region. However, the present disclosure is not limited to the example given above, and the light-emitting source can be appropriately changed according to actual design requirements.

Referring to FIG. 2, the infrared thermometer according to the first embodiment of the present disclosure may be provided with a capacitive distance sensor, and the conductive plate 7 of the capacitive distance sensor is disposed at an end surface 231 of the infrared sensor module support 23. In addition, the infrared thermometer of the first embodiment of the present disclosure is further provided with the inner box 4 in the casing 1, and a power supply unit (not shown) is provided in the inner box 4. The printed circuit board 5 is provided with at least a microprocessor 51. The infrared sensor module 21, the capacitive distance sensor module, and the storage unit are all electrically connected to the microprocessor, and the power supply unit provides power to all electrical components in the infrared thermometer.

Figure 6:
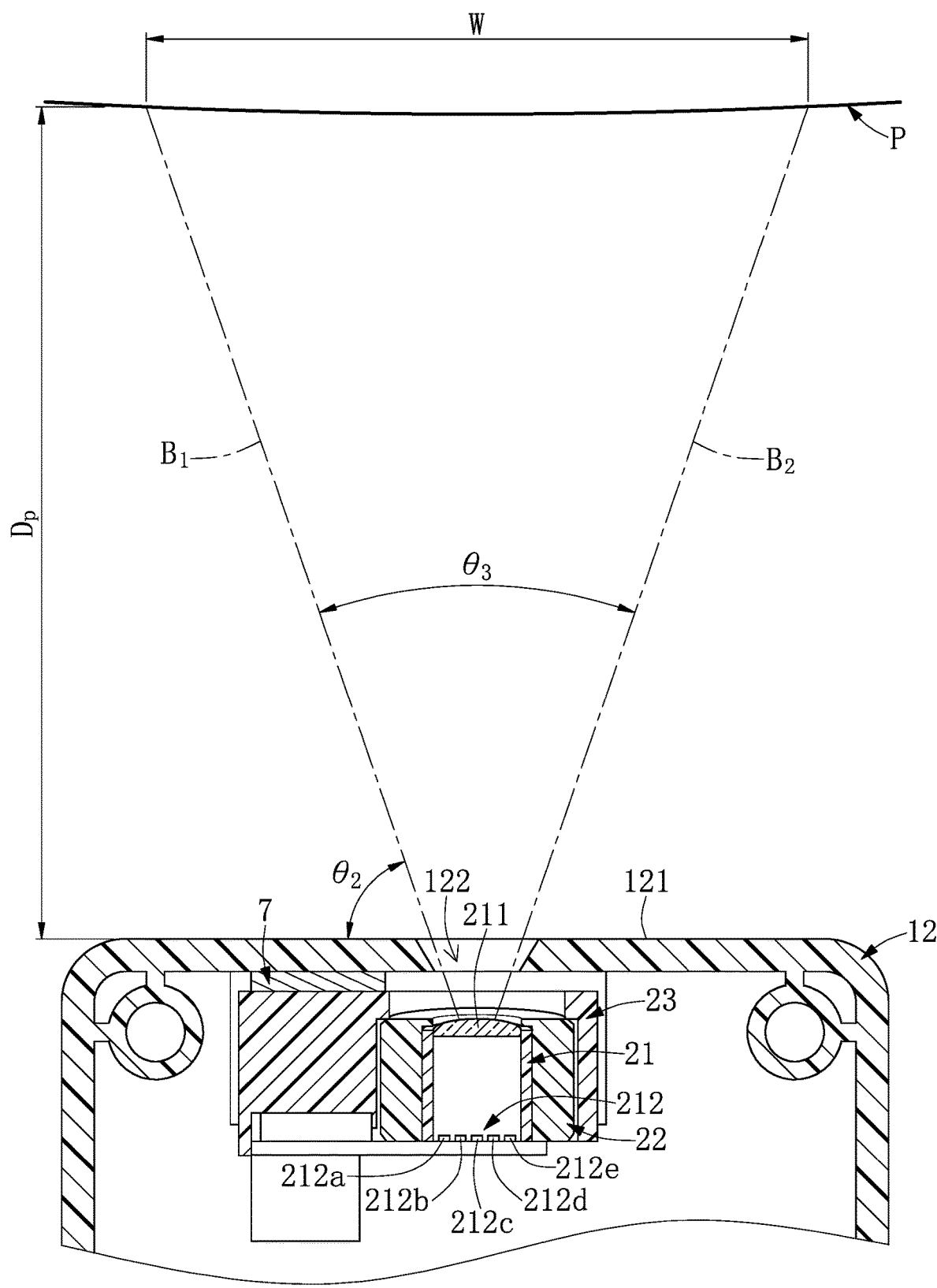
FIG. 6 is a top view of the infrared sensor module according to the first embodiment of the present disclosure.

Referring to FIG. 6, the capacitive distance sensor can measure a distance value $D_p$ between the skin surface P of an object to be measured and the first end wall 121 of the infrared thermometer. In other embodiments, when the distance value $D_p$ measured by the capacitive distance sensor on the skin surface P of the object is a preset distance value stored in the storage unit, the infrared thermometer automatically turns on temperature measurement. The preset distance value is usually 10 to 15 cm. The width of the received infrared region of the infrared sensors 212a to 212e on the skin surface P of the object is the width W. Moreover, two boundaries $B_1$, $B_2$ of the received infrared region and the first end wall 121 of the casing 1 all have an angle $\theta_2$ therebetween. In the embodiment of the present disclosure, the angle $\theta_2$ is about 73.5°, but the present disclosure is not limited thereto. For example, the angle $\theta_2$ may be in a range of 65° to 85°. The angle $\theta_3$ of the received infrared region is about 33°, but the present disclosure is not limited thereto. For example, the angle $\theta_3$ may be in a range of 30° to 60°. The microprocessor 51 calculates the width W between the eyebrows of the object according to the angle $\theta_3$ between the two boundaries $B_1$, $B_2$ and the first end wall 121 of the casing 1 and the distance value $D_p$ between the first end wall 121 and the object's skin surface P. Specifically, the microprocessor 51 can calculate the width W between the eyebrows of the object by virtue of the following formula (I):

$$W = 2 \times D_p \times \tan\frac{\theta_3}{2} \quad \text{Formula (I)}$$

Figure 7:
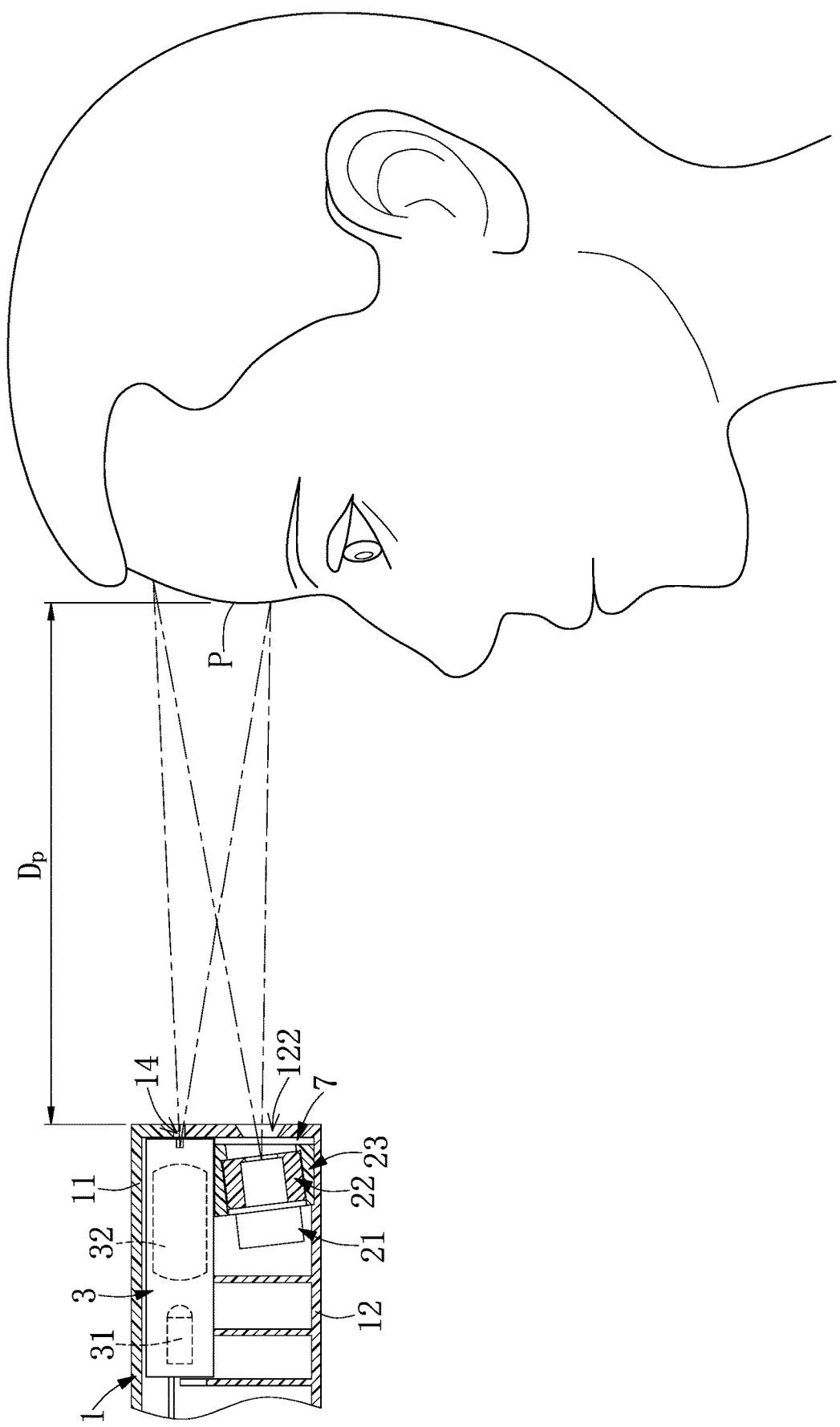
FIG. 7 is a side sectional view of a use state when the infrared thermometer measures body temperature according to the first embodiment of the present disclosure.
Figure 8:
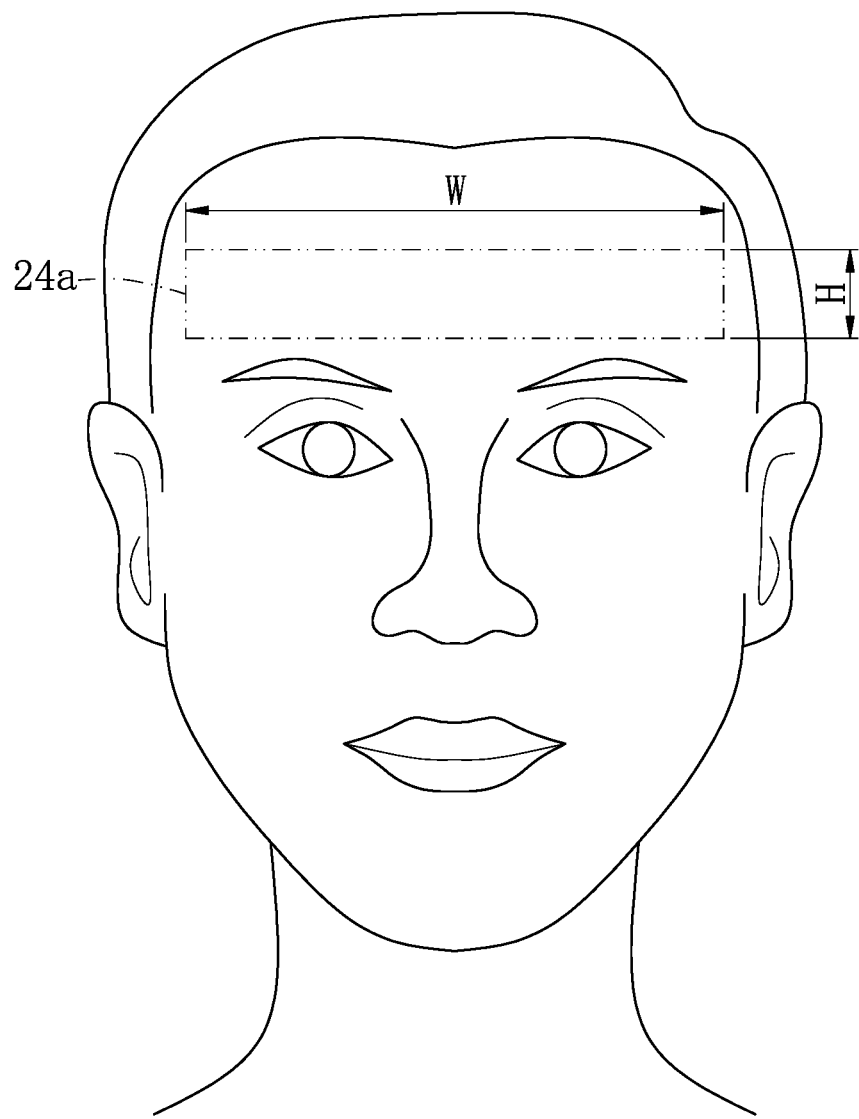
FIG. 8 is a schematic diagram of a first received infrared region according to the first embodiment of the present disclosure.

Referring to FIG. 7 and FIG. 8, the received infrared region of the infrared sensors 212a to 212e has a width W and a height H. It can be seen that the infrared sensors 212a to 212e have a received infrared region 24a. When the distance between the first end wall 121 and the skin surface P of the object is the distance value $D_p$, the received infrared ray is the received infrared region 24a. The distance value $D_p$ is an optimal distance value that the infrared thermometer can perform temperature measurement by receiving infrared rays through the infrared sensor. With the received infrared region 24a, the region in which the elongated light-emitting source of the indicating unit 3 irradiates on the skin surface P of the object is the same as the received infrared region 24a, and is used to indicate the received infrared region 24a to the user. However, the present disclosure is not limited to the example given above. In the embodiment of the infrared thermometer without providing a distance sensor, the region of the indicating unit 3 irradiated on the skin surface P of the object includes the received infrared region 24a, so that the user can still roughly realize the size and location of the received infrared region. In other embodiments, the received infrared region may also be mobile. For example, it may be measured by moving the face from top to bottom or moving the whole face from left to right. Such a mobile received infrared region can measure the entire face, and then measure other high-temperature locations to further calculate the core temperature of a human body, or find the location of skin tissue inflammation and make appropriate treatments.

Figure 9:
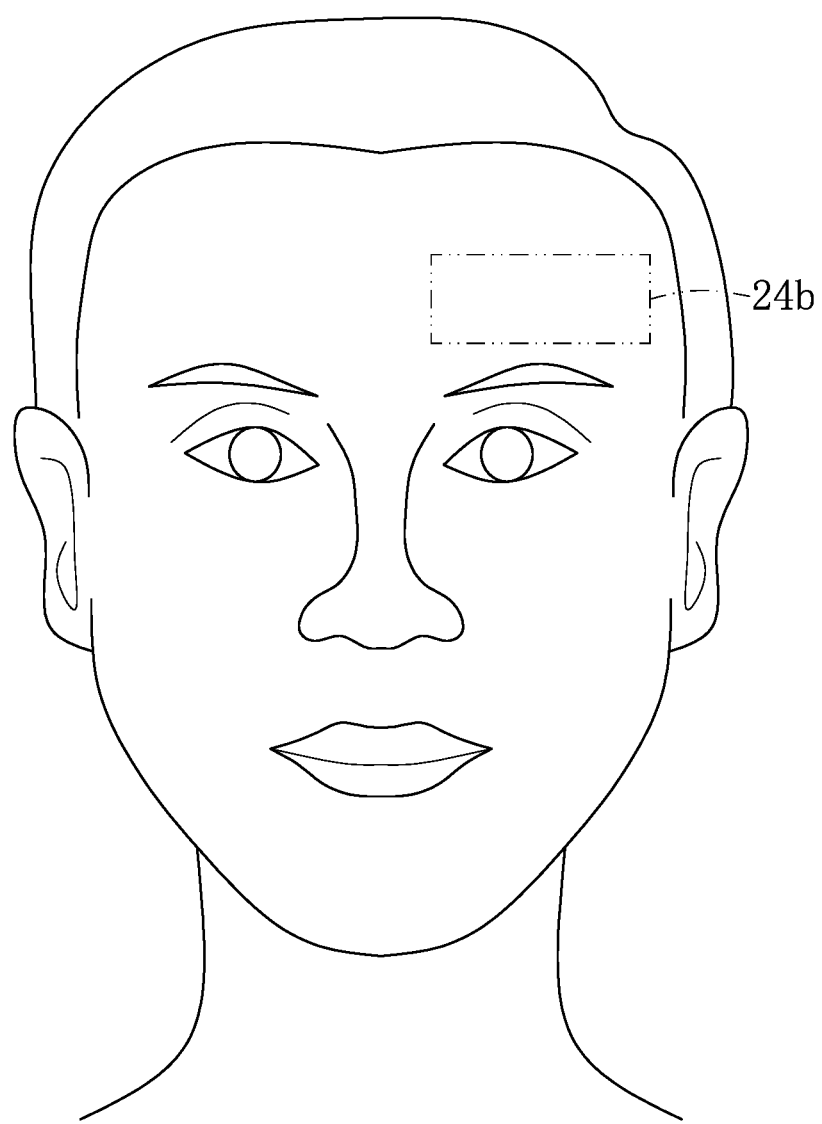
FIG. 9 is a schematic diagram of a second received infrared region according to the first embodiment of the present disclosure.

Referring to FIG. 9, the infrared thermometer of the embodiment of the present disclosure can also measure a part of forehead of the object, for example, the received infrared region 24b.

Figure 10:
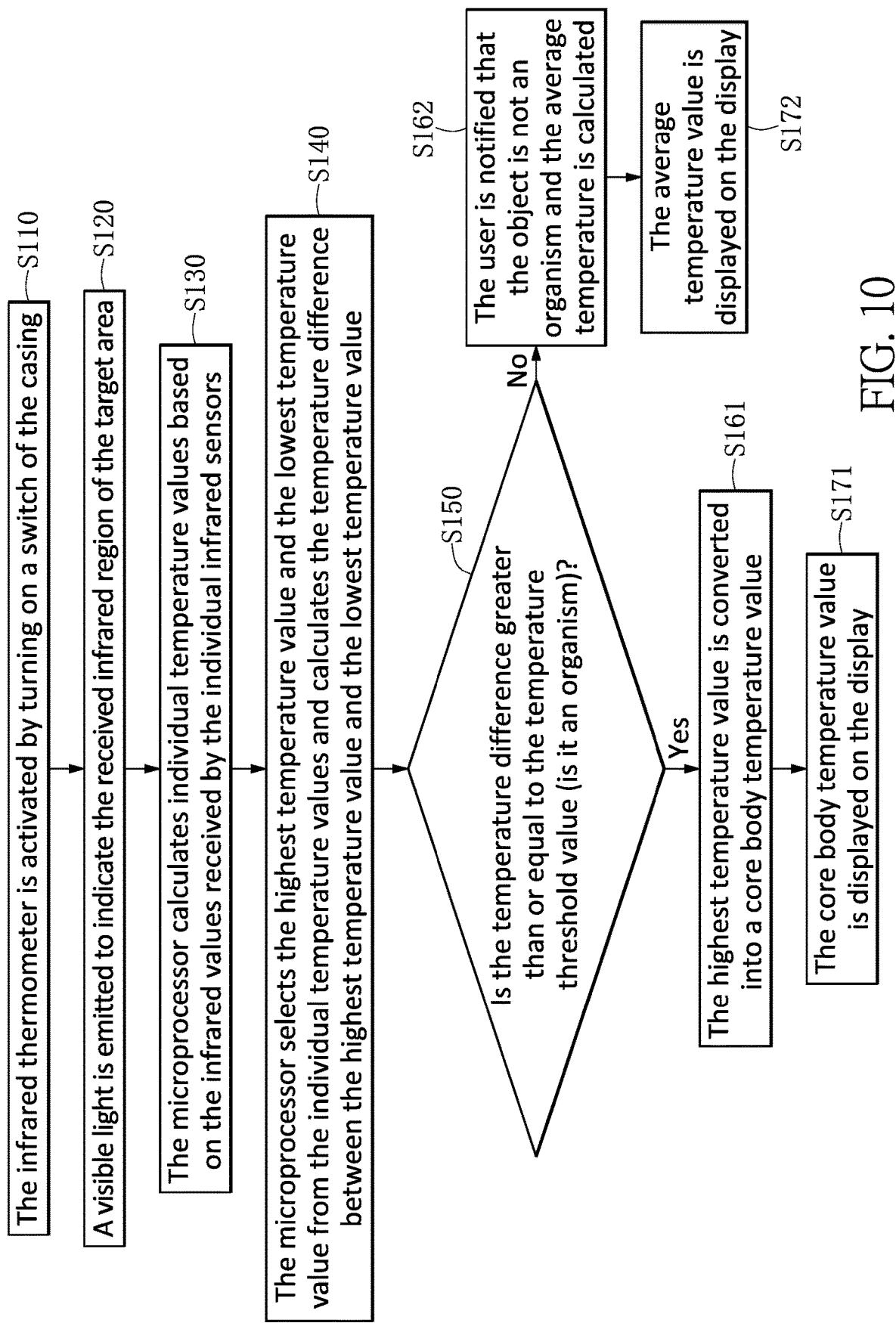
FIG. 10 is an operation flowchart of the infrared thermometer according to the first embodiment of the present disclosure.

Referring to FIG. 10, the operation steps of the first embodiment of the present disclosure are described. The infrared thermometer of this embodiment is activated by turning on a switch 13 of the casing 1 (S110). At this time, the indicating unit 3 of the infrared thermometer emits a visible light through the second opening 14 to indicate the received infrared region 24a of the target area to the user (S120). The microprocessor 51 then calculates individual temperature values based on the infrared values received by the individual infrared sensors 212a to 212e (S130). The microprocessor 51 then selects the highest temperature value and the lowest temperature value obtained from the five temperature values and calculates the temperature difference between the highest temperature value $T_H$ and the lowest temperature value $T_L$ (S140), and determines whether the temperature difference is greater than or equal to the temperature threshold value $T_P$ (S150). If the temperature difference is greater than or equal to the temperature threshold $T_P$, it is determined that the object to be measured is an organism, and the highest temperature value $T_H$ is converted into a core body temperature value (S161), and then the core body temperature value is displayed on the display 6 (S171). If the temperature difference is lower than the temperature threshold $T_P$, the microprocessor 51 notifies the user that the object is not an organism through the display 6 and then calculates the average temperature of the received infrared region 24a of the target area (S162), and finally the average temperature value is displayed on the display 6 (S172).

Figure 11:
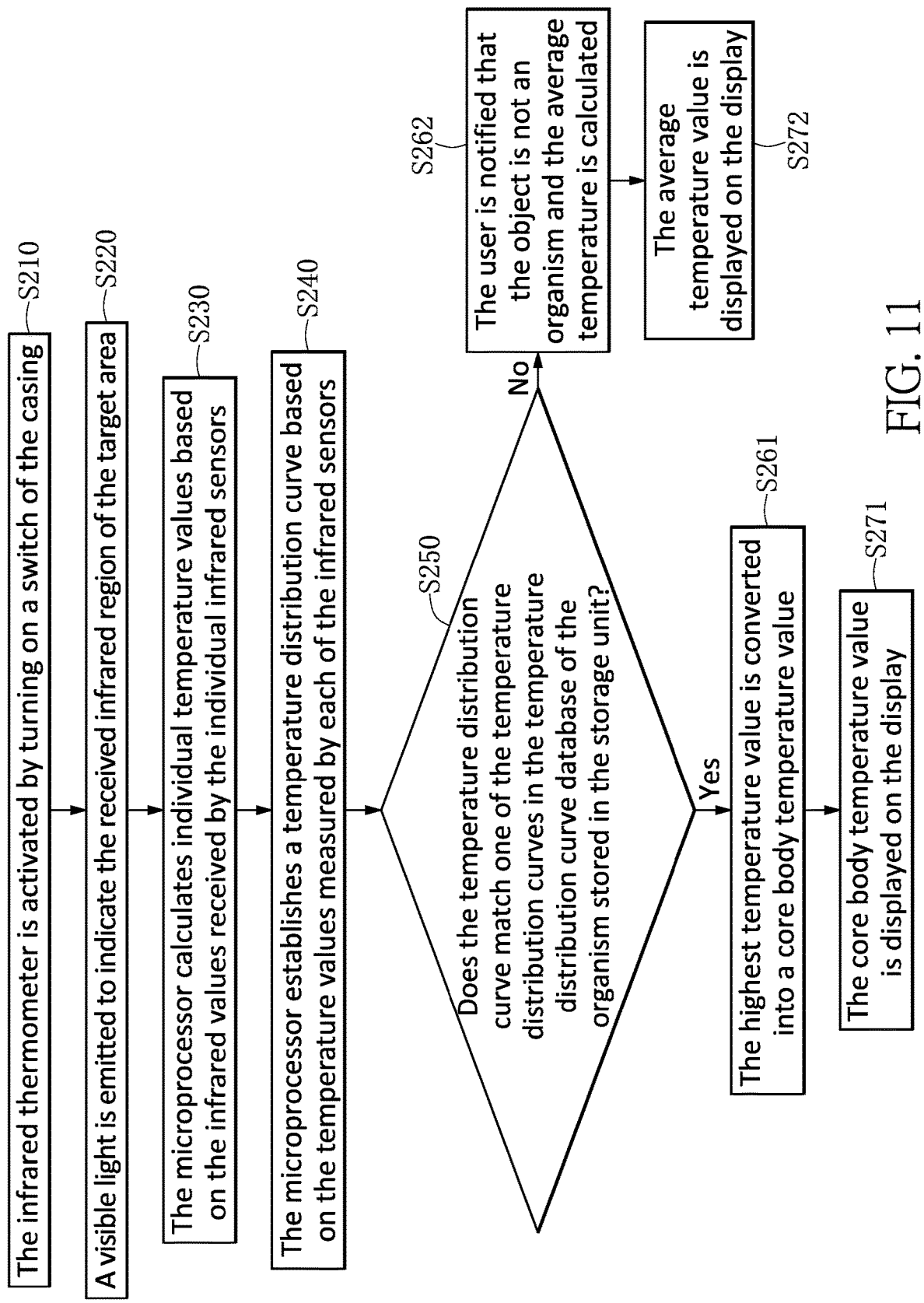
FIG. 11 is an operation flowchart of the infrared thermometer according to the second embodiment of the present disclosure.
Figure 15:
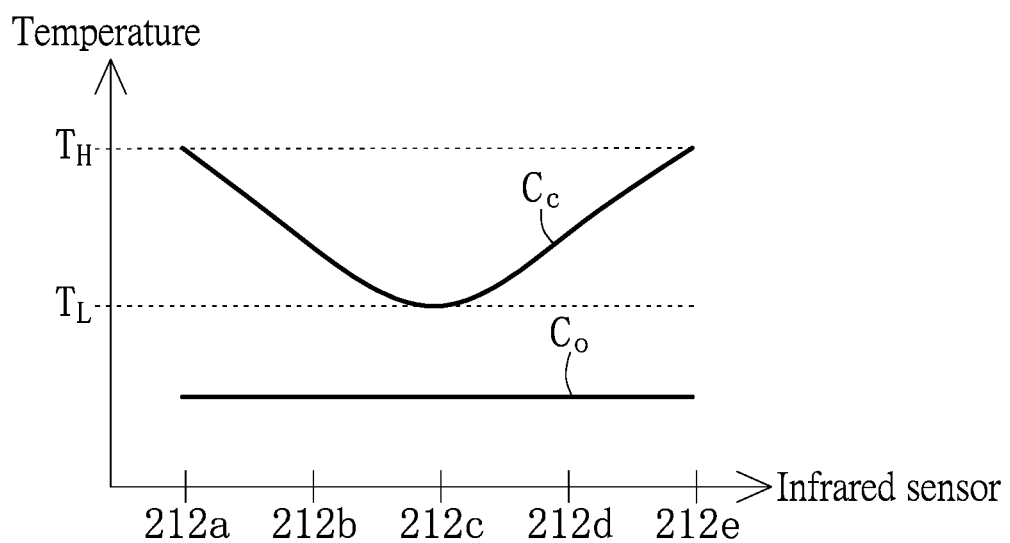
FIG. 15 is a schematic diagram of temperature distribution curves of the second and fourth embodiments of the present disclosure.

Referring to FIG. 11, the operation steps of the second embodiment of the present disclosure are described. The S210, S220, and S230 of the infrared thermometer in the second embodiment of the present disclosure are respectively the same as S110, S120, and S130 of the first embodiment, and description of these steps is omitted here. In this embodiment, after S230, the microprocessor 51 establishes a temperature distribution curve $C_c$, as shown in FIG. 15, based on the temperature values measured by each of the infrared sensors 212a to 212e (S240), where the Y axis shows the temperatures measured by each of the sensors 212a to 212e, and the X axis is used to indicate the respective infrared sensors 212a to 212e. Then the temperature distribution curve database of the organism stored in the storage unit is compared to determine whether the temperature distribution curve $C_c$ is included (S250). If so, it is determined that the object to be measured is an organism, and the highest temperature value $T_H$ is converted into a core body temperature value (S261), and then the core body temperature value is displayed on the display 6 (S271). If the temperature distribution curve $C_c$ is not included, for example, the possible non-organism temperature distribution curve is a line $C_o$ close to a constant temperature, and the microprocessor 51 notifies the user that the object is not an organism through the display 6 and calculates the average temperature of the received infrared region 24a of the target area (S262), and the average temperature value is finally displayed on the display 6 (S272). It should be noted that in other embodiments, S262 and S272 may occur simultaneously. In this embodiment, the line $C_o$ is a line close to a constant temperature, but the present disclosure is not limited thereto, and may be a curve in which the temperature gradually increases or decreases according to actual conditions.

Figures 1, 12:
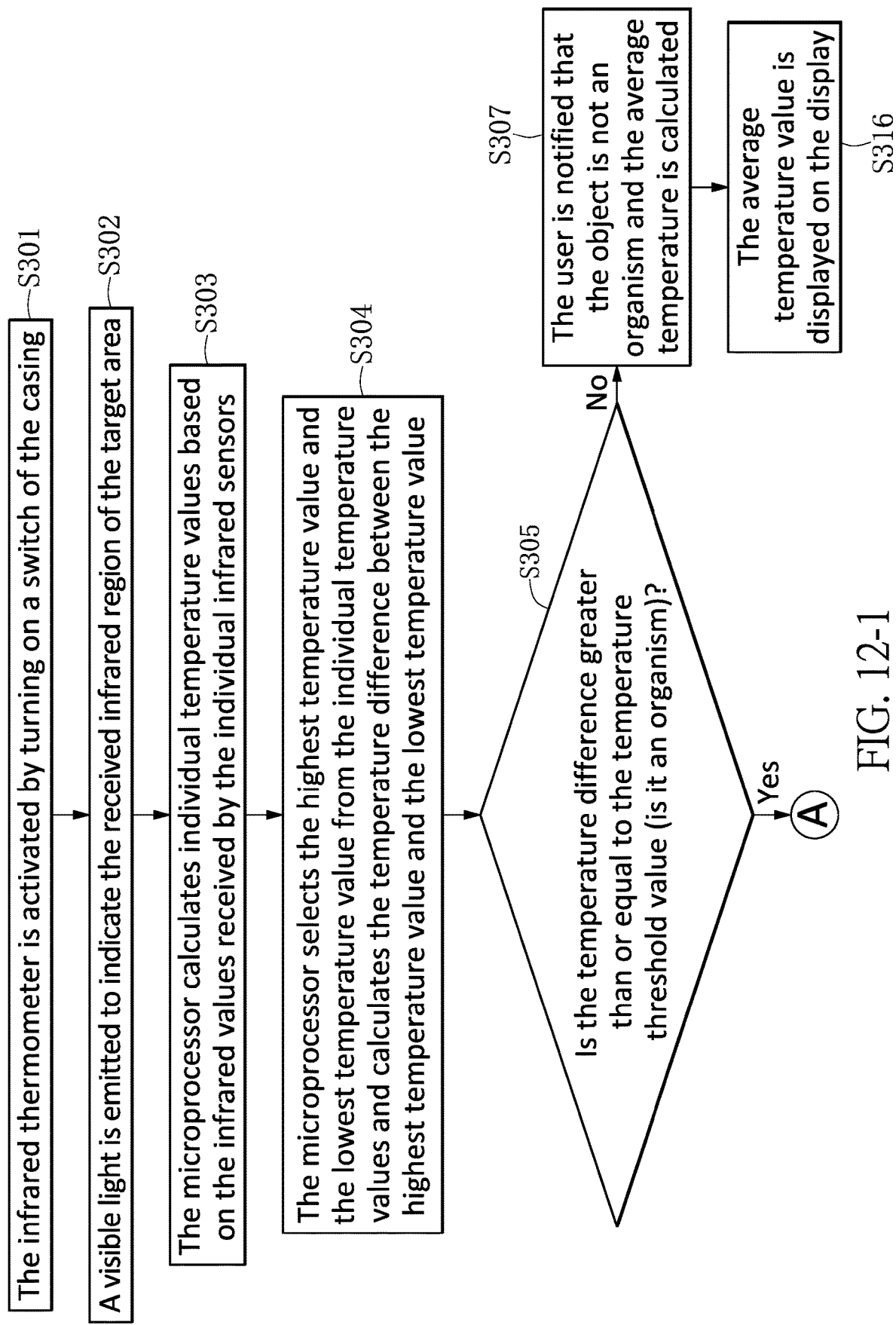
Figures 2, 12:
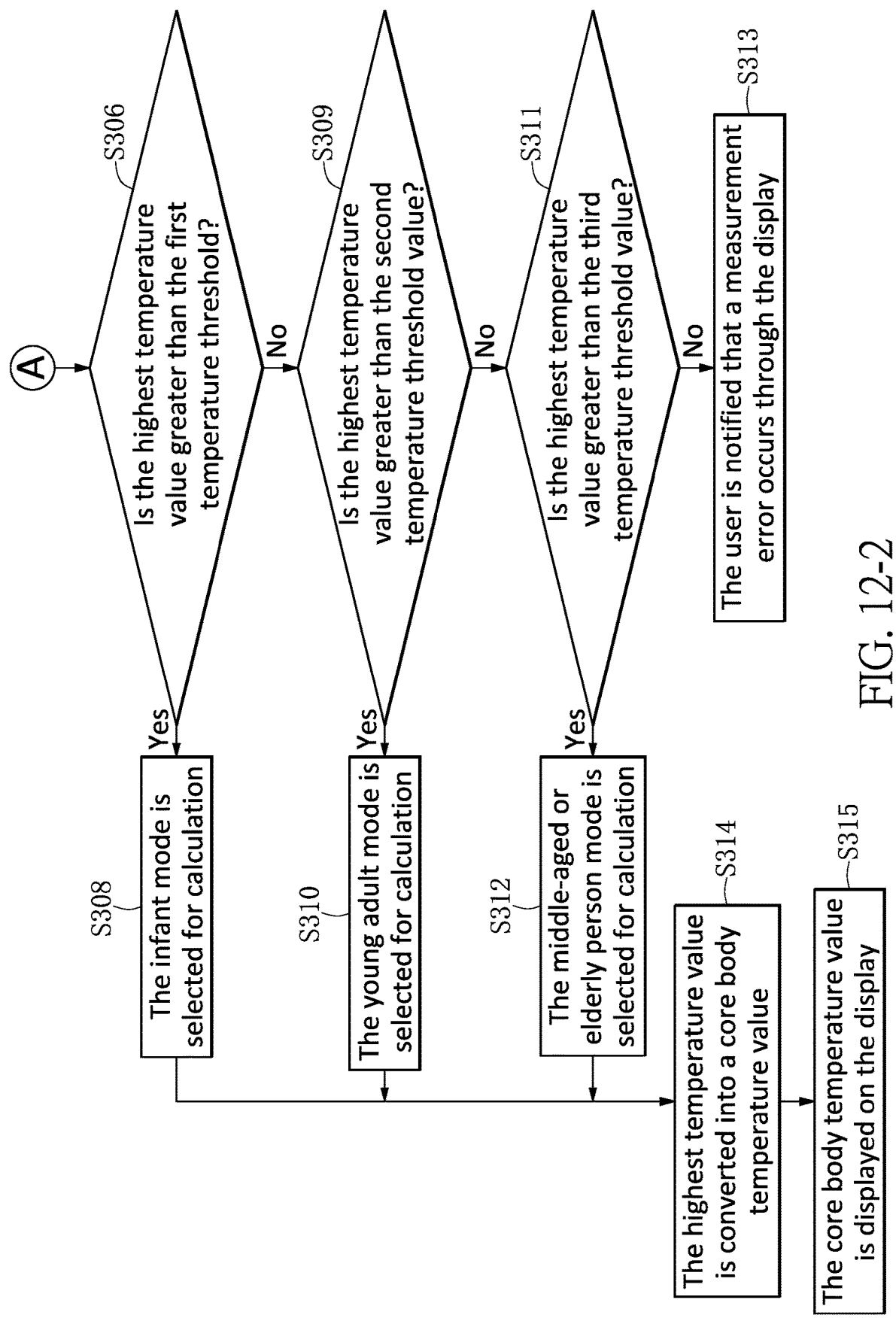

Referring to FIGS. 12-1 and 12-2, the operation steps of the third embodiment of the present disclosure are described. S301, S302, S303, S304, S305, S307, and S316 in the third embodiment of the present disclosure are respectively the same as S110, S120, S130, S140, S150, S161, and S172 in the first embodiment, and description of these steps is omitted here. In S305, after determining that the temperature difference is greater than or equal to the temperature threshold $T_p$ (that is, determining that the object is an organism), the microprocessor 51 further determines whether the highest temperature value $T_H$ is greater than the first temperature threshold $T_{t1}$ (S306). If the highest temperature value $T_H$ is greater than the first temperature threshold $T_{t1}$, the infant (aged under 6 years) mode is selected for calculation (S308). If the highest temperature value $T_H$ is less than the first temperature threshold value $T_{t1}$, it is determined whether the highest temperature value $T_H$ is greater than the second temperature threshold value $T_{t2}$ (S309). If the highest temperature value $T_H$ is greater than the second temperature threshold value $T_{t2}$, the young adult mode is selected for calculation (S310). If the highest temperature value $T_H$ is less than the second temperature threshold value $T_{t2}$, it is determined whether the highest temperature value $T_H$ is greater than the third temperature threshold value $T_{t2}$ (S311). If the highest temperature value $T_H$ is greater than the third temperature threshold $T_{t3}$, the middle-aged or elderly person mode is selected for calculation (S312). If the highest temperature value $T_H$ is less than the third temperature threshold value $T_{t3}$, the microprocessor 51 notifies a measurement error by means of an icon or a message to the user through the display 6 (S313). After S308, S310, and S312, the highest temperature value $T_H$ is converted into a core body temperature value through an applicable calculation mode (S314). Finally, the core body temperature value is displayed on the display 6 (S315). In this embodiment, the first temperature threshold $T_{t1}$ stored in the storage unit is preferably 36.2° C., the second temperature threshold $T_{t2}$ is preferably 35.8° C., and the third temperature threshold $T_{t3}$ is preferably 35.5° C. In addition, when converted into a core body temperature, the core body temperature value calculated through the infant mode is the highest temperature value plus 1.45° C. (compensation temperature), the core body temperature value calculated through the young adult mode is the highest temperature value plus 1.3° C., and the core body temperature value calculated through the middle-aged or elderly person mode is the highest temperature value plus 1.2° C. The above temperature value and compensation temperature can be referred to the article "Detection of body temperature with infrared thermography: accuracy in detection of fever" written by Dr. Cheung Man Yung et al. and published on the Hong Kong Medical Journal, Vol. 18, and those skilled in the art can appropriately change the temperature threshold and compensate the temperature according to the actual ambient temperature changes to achieve a more accurate temperature measurement effect.

Figures 1, 13:
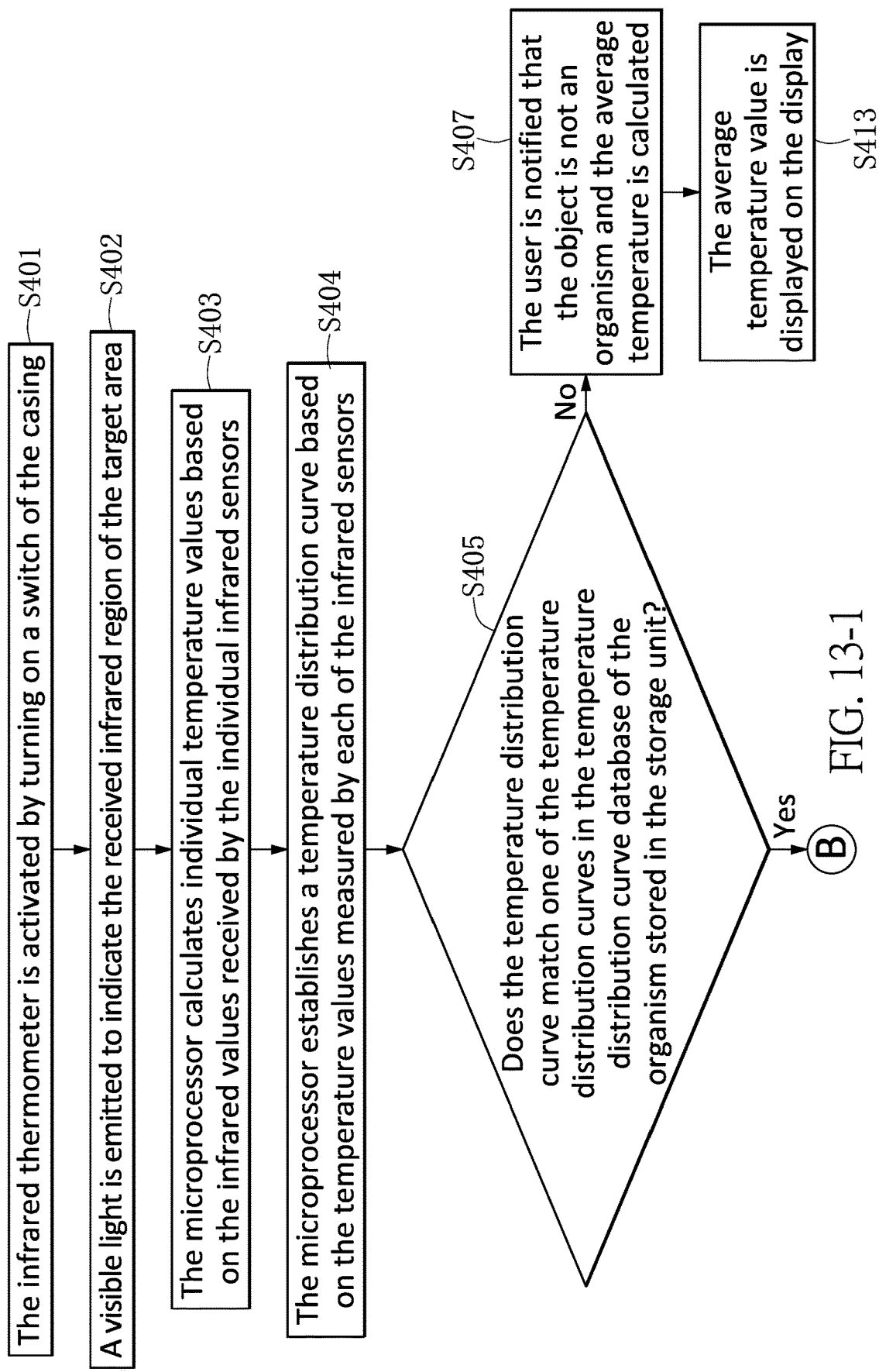
Figures 2, 13:
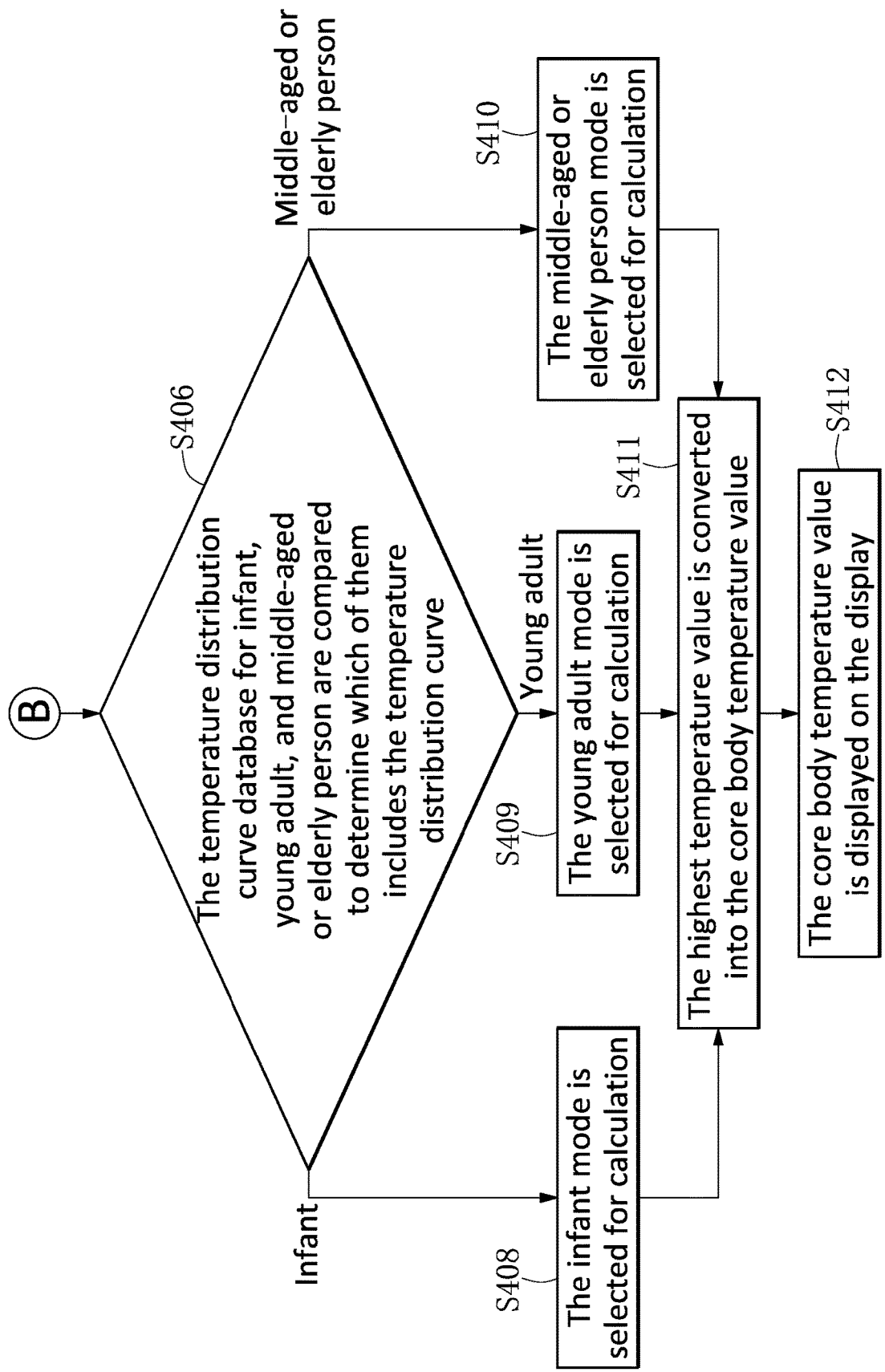

Referring to FIGS. 13-1 and 13-2, the operation steps of the fourth embodiment of the present disclosure are described. S401, S402, S403, S404, S405, S407, and S413 in the fourth embodiment of the present disclosure are respectively the same as S210, S220, S240, S250, S262, and S272 in the second embodiment, and description of these steps is omitted here. In step S405, after comparing the temperature distribution curve database of the organism stored in the storage unit, and determining that the temperature distribution curve $C_c$ is included (that is, determining that the object is an organism), the microprocessor 51 further compares the temperature distribution curve database for infant (aged under 6 years), the temperature distribution curve for young adult (aged 7-29 years), and the temperature distribution curve database for middle-aged or elderly person (aged over 30 years) stored in the storage unit to determine which of them includes the temperature distribution curve $C_c$ (S406). If the temperature distribution curve database of infant includes the temperature distribution curve $C_c$, the infant mode is selected for calculation (S408); if the temperature distribution curve database of the young adult includes the temperature distribution curve $C_c$, the young adult mode is used for calculation (S409); and if the temperature distribution curve database of the middle-aged or elderly person includes the temperature distribution curve $C_c$, the middle-aged or elderly person mode is selected for calculation (S410). After S408, S409, and S410, the highest temperature value $T_H$ is converted into the core body temperature value through an applicable calculation mode (S411), and the core body temperature value is displayed on the display 6 (S412). In this way, the age group of the object can be determined to improve the accuracy of calculating the core body temperature value. In this embodiment and the third embodiment, the method for converting the core body temperature is the same; that is, the core body temperature value calculated in the infant mode is the highest temperature value plus 1.45° C.; the core body temperature value calculated in the young adult mode is the highest temperature value plus 1.3° C.; and the core body temperature calculated in the middle-aged or elderly person mode is the highest temperature value plus 1.2° C. In addition, the use of different modes to calculate the core body temperature value can be automatic, or the microprocessor 51 can instruct the display 6 to indicate to the user whether the object to be measured is an infant, a young adult or a middle-aged or elderly person through an icon, and then the display 6 notifies the user to switch the operation mode, for example, by means of a button 114 or a button 115 provided on the surface 113 of the upper casing 11.

Figures 1, 14:
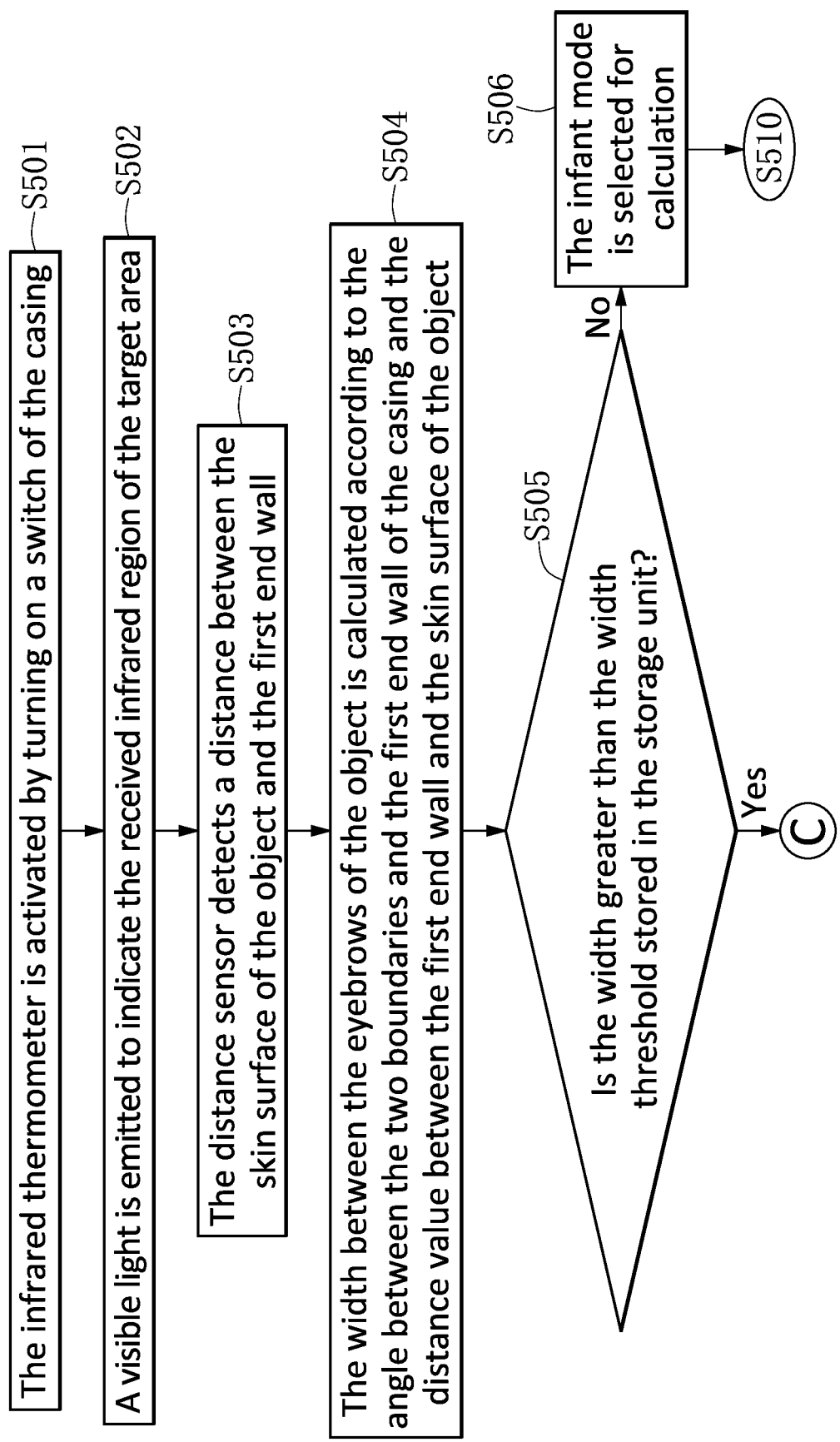
Figures 2, 14:
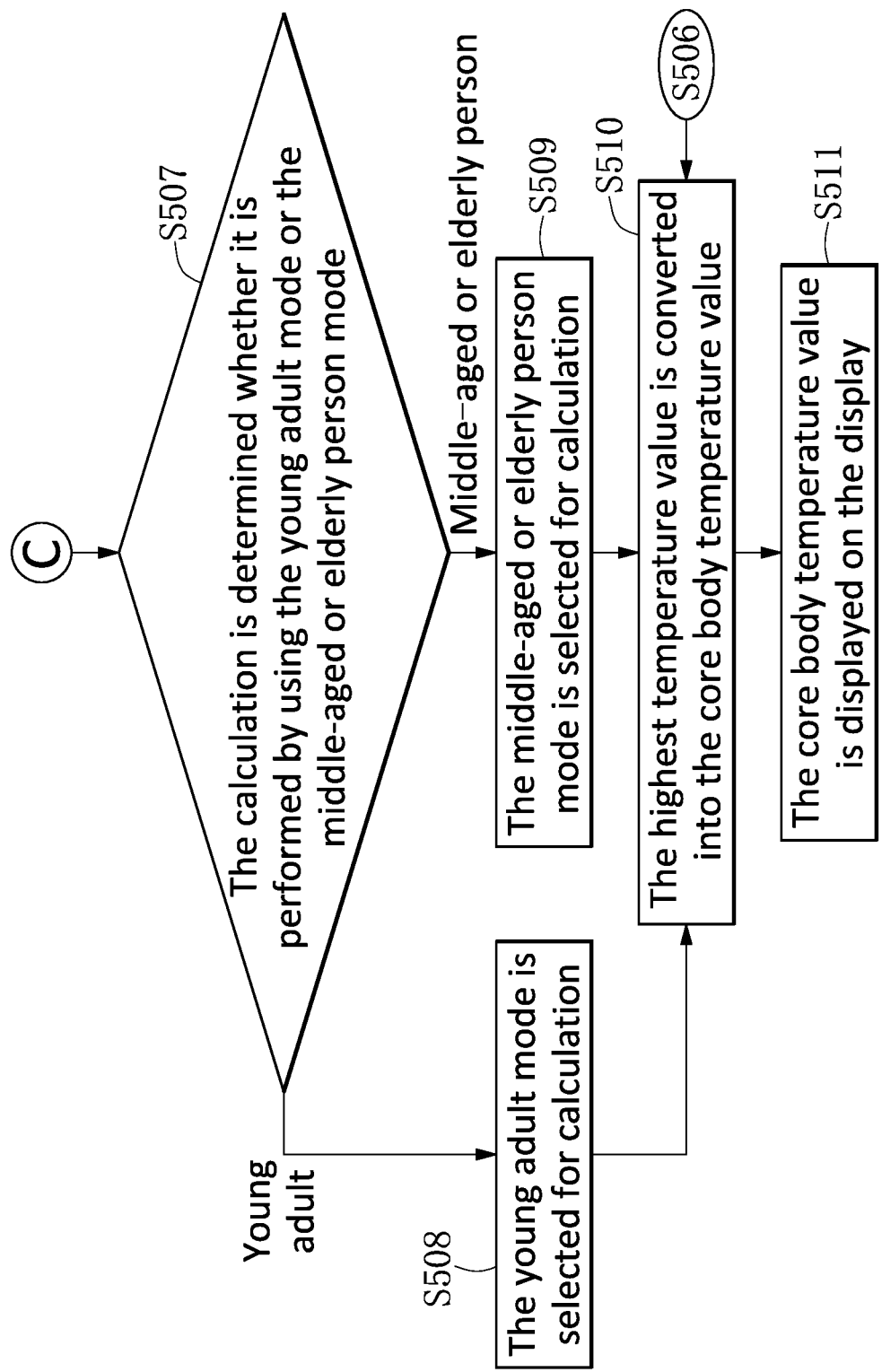

Referring to FIGS. 14-1 and 14-2, in the fifth embodiment of the present disclosure, the infrared thermometer 100 is activated by turning on the switch 13 of the casing 1 (S501). At this time, the indicating unit 3 of the infrared thermometer 100 emits a visible light through the second opening 123 to indicate the received infrared region 24a of the target area to the user (S502). The distance sensor detects a distance value $D_p$ between the object's skin surface P and the first end wall 121 (S503). The microprocessor 51 calculates the width W between the eyebrows of the object according to the angle $\theta_2$ between the two boundaries $B_1$, $B_2$ and the first end wall 121 of the casing 1 and the distance value $D_p$ between the first end wall 121 and the object's skin surface P (as shown in FIG. 8) (S504).

Further, the microprocessor 51 determines whether the width W is greater than the width threshold $W_t$ stored in the storage unit (S505). If the width W is less than the width threshold $W_t$, the infant mode is selected for calculation (S506). If it is greater than the width threshold $W_t$, it is determined whether the calculation is performed by using the young adult mode or the middle-aged or elderly person mode through S309-S312 of the third embodiment or S406 of the fourth embodiment (S507). After selecting the young adult mode for calculation (S508) and the middle-aged or elderly person mode for calculation (S509) and S506, the highest temperature value $T_H$ is converted into the core body temperature value through the applicable calculation mode (S510). After that, the core body temperature value is displayed on the display 6 (S511). This embodiment can also be used after the first and second embodiments. Specifically, after S150 of the first embodiment or S250 of the second embodiment in which the object is determined to be an organism, the step proceeds to S503 of this embodiment.

Advantageous Effects of the Embodiment

One of the beneficial effects of the present disclosure is that the non-contact infrared thermometer provided by the present disclosure is capable of improving the measurement accuracy and convenience of the non-contact infrared thermometer by means of the technical solutions of "infrared sensors arranged in serial" and "an indicating unit configured to indicate the received infrared region of the infrared sensor to the user".

Furthermore, a plurality of infrared sensors can eliminate the need to measure the forehead temperature with a single-point infrared sensor for the user. The measured point is not necessarily the skin surface temperature closest to the core temperature of the object; that is, not the skin surface closest to the arteries. The present disclosure employs a plurality of infrared sensors to scan and obtain multiple skin surface temperatures and then filters the highest temperature value. Afterwards, the highest temperature value is converted into the core body temperature value to increase the accuracy of temperature measurement of the non-contact infrared thermometer. In addition, a plurality of infrared sensors of the present disclosure are arranged in serial with "an indicating unit for indicating the received infrared region of the infrared sensor to the user", which helps the user not need to manually scan multiple points on the surface of the skin, and are in cooperation with the indicating unit to allow the user to clearly realize the scanning region of the infrared sensor and find the correct measurement temperature region, thereby facilitating the improvement of operation convenience and measurement accuracy of the non-contact infrared thermometer.

Another beneficial effect of the present disclosure is that the non-contact infrared thermometer and operation method thereof provided by the present disclosure can prevent the user from using the infrared thermometer to measure non-organisms to result in incorrect temperature values by means of the technical solutions of "infrared sensors arranged in serial", "microprocessor filtering a plurality of temperature values to select the highest temperature value and the lowest temperature value, calculating the temperature difference between the highest temperature value and the lowest temperature value, and determining whether the temperature difference is higher than the temperature threshold value, and "microprocessor determining whether the temperature distribution curve database of an organism stored in the storage unit includes a temperature distribution curve of the measured surface temperature.

Still another beneficial effect of the present disclosure is that the non-contact infrared thermometer provided by the present disclosure and the method for operating the same can switch the calculation among the infant mode, the young adult mode and the middle-aged or elderly person mode to increase the accuracy of the calculated core body temperature value by means of the technical solutions of "infrared sensors arranged in serial", "determining whether an object to be measured is an organism, "determining which of the temperature distribution curve database for infant, the temperature distribution curve database for young adult, and the temperature distribution curve database for middle-aged or elderly person stored in the storage unit includes the temperature distribution curve of the measured surface temperature" and/or "calculating the width of the eyebrows of the object in cooperation with a distance sensor".

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A non-contact infrared thermometer for measuring the temperature of a target area of an object to be measured, comprising:
   at least three infrared sensors arranged in serial to receive an infrared ray at the target area;
   an indicating unit configured to emit a visible light on the target area to indicate a received infrared region;
   a microprocessor configured to receive and process the infrared ray measured by the at least three infrared sensors to provide at least three temperature values, thereby determining that the object to be measured is an organism; and
   a storage unit configured to store a temperature distribution curve database of the organism to provide the microprocessor with access.

2. The non-contact infrared thermometer according to claim 1, wherein the visible light is an elongated visible light.

3. The non-contact infrared thermometer according to claim 1, wherein the visible light is a green light or a red light.

4. The non-contact infrared thermometer according to claim 1, wherein the indicating unit comprises at least one light emitting diode and a light guide element.

5. The non-contact infrared thermometer according to claim 1, wherein when the object to be measured is a human body, the target area is a part of a face.

6. The non-contact infrared thermometer according to claim 1, wherein the microprocessor establishes a temperature distribution curve based on the at least three temperature values; when the temperature distribution curve database of the organism includes the temperature distribution curve, the microprocessor determines that the object to be measured is an organism.

7. The non-contact infrared thermometer according to claim 1, wherein the storage unit is configured to store a temperature threshold value to provide the microprocessor with access.

8. The non-contact infrared thermometer according to claim 7, wherein the microprocessor filters the at least three temperature values to select a highest temperature value and a lowest temperature value; when the temperature difference between the highest temperature value and the lowest temperature value is greater than or equal to the temperature threshold value, the microprocessor determines that the object to be measured is an organism.

9. The non-contact infrared thermometer according to claim 6, wherein the microprocessor selects the highest temperature value obtained from the at least three temperature values and converts the highest temperature value into a core body temperature value.

10. The non-contact infrared thermometer according to claim 8, wherein the microprocessor selects the highest temperature value obtained from the at least three temperature values and converts the highest temperature value into a core body temperature value.

11. A method for operating a non-contact infrared thermometer, comprising:
    emitting a visible light from an indicating unit of the non-contact infrared thermometer to indicate a received infrared region of a target area of the object to be measured,
    receiving infrared values by at least three infrared sensors of the non-contact infrared thermometer to calculate individual temperature values; and
    determining that the object to be measured is an organism by a microprocessor of the non-contact infrared thermometer;
    wherein after the step of receiving the infrared values is performed, the method further comprises:
        establishing a temperature distribution curve based on the temperature values measured by each of the at least three infrared sensors; and
        determining that the temperature distribution curve is included in a temperature distribution curve database of organism stored in a storage unit of the non-contact infrared thermometer.

12. The method according to claim 11, wherein after the step of determining that the temperature distribution curve is included in the temperature distribution curve database of organism is performed, the method further comprises:
    converting a highest temperature value of the temperatures measured by each of the at least three infrared sensors into a core body temperature value.

13. The method according to claim 12, wherein after the step of converting the highest temperature value of the temperatures measured by each of the at least three infrared sensors into the core body temperature value is performed, the method further comprises:
    displaying the core body temperature value on a display of the non-contact infrared thermometer.

14. The method according to claim 11, wherein after the step of receiving the infrared values is performed, the method further comprises:
    selecting a highest temperature value and a lowest temperature value obtained from the individual temperature values and calculating the temperature difference between the highest temperature value and the lowest temperature value by a microprocessor of the non-infrared thermometer; and
    determining that the temperature difference is greater than or equal to a temperature threshold value by the microprocessor of the non-infrared thermometer.

15. The method according to claim 14, wherein the step of determining that the temperature difference is greater than or equal to the temperature threshold value is performed, the method further comprises:
    converting the highest temperature value into a core body temperature value by the microprocessor.

16. The method according to claim 15, after the step of converting the highest temperature value into the core body temperature value, the method further comprises:
    displaying the core body temperature value on a display of the non-contact infrared thermometer.

* * * * *